May 12, 1970     J. T. McNANEY     3,512,028

INDICATING DEVICE OF THE GASEOUS GLOW TYPE

Filed Feb. 28, 1968

INVENTOR.

*Joseph T. McNaney*

United States Patent Office 3,512,028
Patented May 12, 1970

3,512,028
INDICATING DEVICE OF THE GASEOUS GLOW TYPE
Joseph T. McNaney, 8548 Boulder Drive, La Mesa, Calif. 92041
Filed Feb. 28, 1968, Ser. No. 709,115
Int. Cl. H01j 61/66
U.S. Cl. 313—109.5    6 Claims

ABSTRACT OF THE DISCLOSURE

The present invention relates to a gaseous glow character display device having an envelope comprised of an electrically conducting plate and a light transparent plate with a thin layer of material at the extreme edges of each plate for supporting them in a spaced-apart relationship and containing therein an ionizable medium. The respective plates serve as front and rear portions of a sandwich-like structure. Within such structure there is an array of cathode electrodes representing a number of electrically isolated segments of a variety of differently formed character shaped arrays each, therefore, overlapping one another within a common viewing area of the device, and supported on the inner surface of the transparent plate. Other embodiments utilize a second array of such segments for the purpose of improving the legibility of character presentations. This second array is closely adjacent the first array; both arrays overlapping one another in the same viewing area. The rear portion of the envelope serves as the anode electrode of the device and a large variety of cathode segments are energized selectively to provide a large number of different, and legible, characters for viewing.

BACKGROUND OF THE INVENTION

The indicating device of this invention relates in a general way to gaseous glow lamps containing a glass envelope in which there is a number of electrodes, including an anode and a number of differently shaped cathode electrodes, and an ionizable medium which permits a cathode to glow when connected to a suitable source of voltage. More particularly this invention relates to such glow lamps wherein the cathodes are but segments of a complete character.

Prior art devices wherein the characters are composed of a plurality of predetermined cathode segments, however, utilize space in height, width and depth out of proportion to the size of the character being displayed by the device. Also these devices are somewhat fragile and relatively complicated and expensive to manufacture.

SUMMARY OF THE INVENTION

The invention described herein represents an improvement over presently available devices of the type referred to herein in that the structure and the efficient utilization of the parts thereof provide a most durable, simple and inexpensive device. The essential parts of the envelope, in combination with a much simplified cathode electrode assembly, lend themselves to mass production techniques involving the mere engagement and sealing of a pair of plate-like members while in an evacuation chamber. This invention also lends itself extremely well to the manufacture of a very compact device wherein the bulk of the device is small in relation to the size of characters displayed.

The novel features that are considered characteristic of this invention are set forth with particularity in the appended claims. Other objects of the invention will best be understood from the following description when read with the accompanying drawing.

DESCRIPTION OF THE PREFERRED EMBODIMENTS

Figure 1:
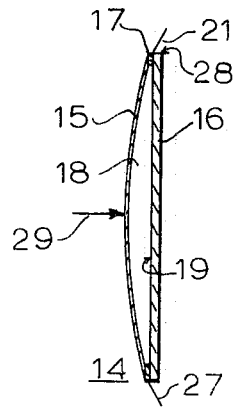
FIG. 1 is a cross sectional view of one embodiment of a device of this invention.
Figure 2:
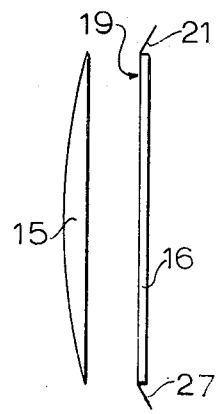
FIG. 2 represents a showing of the two essential parts of which the device of FIG. 1 is comprised, in the form of an end view thereof, namely, an electrically conductive plate and a transparent plate.

Referring to FIG. 1, and also to FIG. 2, a device of this invention is shown as comprising two component parts described herein as an electrically conductive plate 15 and a light transparent plate 16. In FIG. 1 a device 14, shown in cross section, shows the conductive plate 15, hereinafter referred to also as rear plate 15, and the transparent plate 16, hereinafter referred to also as front plate 16, joined together at the outer edges thereof with a vacuum sealing material 17. Vacuum sealing material 17 may be silver chloride solder, an epoxy, or a gasket of indium with gallium seal material. The rear plate 15 is shown as being concaved sufficiently to provide some space 18 between the respective plates, however, if a gasket having the required thickness is used the rear plate 15 may be flat. Or, one or both of the plates 15 and 16 may be provided with a greater thickness material around the extreme edges thereof as another means of providing the space 18. FIG. 2 shows the two plates 15 and 16 as they might be positioned just prior to being joined and vacuum sealed.

Figure 3:
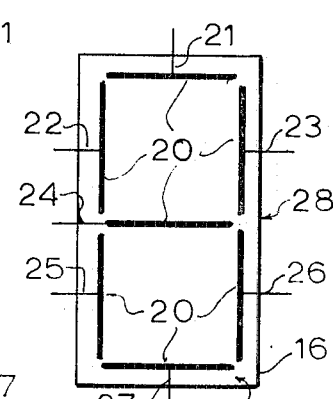
FIG. 3 is a plan view of the transparent plate showing a seven segment array of cathode electrodes supported thereon.
Figure 4:
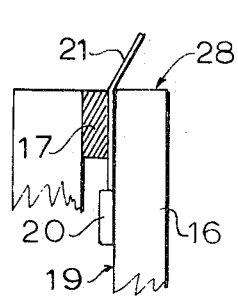
FIG. 4 represents a small portion of the transparent plate to exemplify the showing of a cathode electrode and a conductor lead thereon.

A plan view of the front plate 16 in FIG. 3 shows an array of seven segments 20 of electrically conductive material designed to function as the cathode electrodes of the device 14. These segments 20 may be in the form of metal parts secured to the surface 19 with an epoxy, or other well known means, or they may be deposited thereon by chemical etching means, or, electrically. Also secured to the surface 19 is a set of conductors 21 through 27, each extending beyond the edge 28 of the surface 19 and, therefore, beyond the limits of the outer edge 28 of the device 14. A detail of one of these conductors 21 and a segment 20 is shown in FIG. 4. The front plate 16 may be of glass, plastic, or an equivalent light transparent material.

Upon the application of a voltage between any appropriate contact means 29 to the rear plate 15 and a predetermined one, or group, of conductors 21 through 27, a corresponding array of segments 20 will effect a gaseous glow in the medium closely adjacent thereto. This medium will be one capable of supporting a cold cathode glow, and in the form of a gas such as neon, argon, or the like at a pressure in the range of about 50 to about 100 mm. of Hg. One polarity of a voltage will be connected to the rear plate 15 and the opposite polarity will be connected to segments 20, and because of the many different combinations possible for connecting segments to the opposite voltage polarity, each such combination corresponds to differently formed character shaped arrangement of segments, made visible by the gaseous glow of the medium adjacent thereto. In order to prevent a gaseous glow of the medium adjacent any of the conductors 21 through 27, they will be coated with an insulating material, such as an enamel (not shown in the diagram).

The device 14 of this invention will be evacuated and filled with a required gas of a type hereinbefore stated, and also with a sputter-inhibiting agent in the form of a heavy molecular weight gas, such as mercury, while in an evacuation chamber and before the rear plate 15 and the front plate 16 are joined together. Therefore, while in the evacuation chamber the rear plate 15 and the front plate 16 are actually brought together and joined by means of a vacuum sealing material 17; the device 14 then being removed from such a chamber in the form of a complete unit.

Before being subjected to an evacuation chamber environment the device 14 will be in the form of but two component parts, each being provided, for example, with the required vacuum sealing material 17 at the outer edges thereof. By well known methods these two parts are brought together while in the evacuation chamber and sealed while within, or passing through, such a chamber. As hereinbefore described, the rear plate 15 may simply be a relatively small, flat piece of metal and the front plate 16 may be a flat piece of Lucite, the size of plate 15, having the array of cathode electrodes 20 affixed thereto.

Many different character shaped arrangements of glowing gas may be established by a selective energization of the seven segments 20. For example, if all seven are energized they could represent a numeral 8; if all but the segment connected to conductor 25 are energized they could represent a numeral 9; if all segments but those connected to conductors 22 and 23 are energized they could represent a numeral 3, etc. Therefore, all numerals 0 through 9, as well as many different letters of the alphabet may be established by different combinations of energized segments 20. However, the variety and number of characters will be increased many times through the use of still more segments 20, and in the manner illustrated in FIG. 11, wherein there are twenty segments 20 deposited on the front plate 16.

Figure 5:
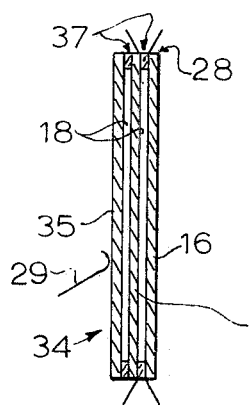
FIG. 5 is a cross sectional view of another embodiment of the invention.

Referring now to FIGS. 5, 6, 7 and 8, still another combination of component parts are illustrated and designed to provide a device of this invention wherein the legibility of the displayed characters have been improved, for example, over the seven-segment arrangement of FIG. 3. The cross sectional view of the device 34 in FIG. 5 shows it to be comprised of an envelope having a rear plate 35 and a front plate 16. This rear plate 35 is shown as being flat while its equivalent in FIGS. 1 and 2 is shown to be concave. Between the rear plate 35 and the front plate 16 there is a third plate 36 in the space 18, and a gasket 37, or equivalent means, is used to provide a required space 18 between the respective plates of the device 34. The intermediate plate 36 has openings 31 therethrough as a means for uniting the space 18 on opposite sides of the intermediate plate 36.

In this particular embodiment the front plate 16 is supporting twelve segments 30, or cathode electrodes 30, which will be utilized in combination with eight segments 40, or cathode electrodes 40, to provide the improved character legibility insofar as the possibilities of the seven-segment arrangement is concerned. The segments 30 are on a surface 19 directly opposite and closely spaced from the segments 40 on a surface 39 of the plate 36, and each set of segments are supported on relatively small size plate members 16 and 36.

Many different character shaped arrangements of glowing gas will be provided by the selective energization of the combination of segments 30 and 40. For example, all eight segments 40 will provide a numeral 8; a number 9 could be made quite legible from various combinations of segments, including segments 40 connected to conductors 41, 42, 43, 48 and 49, and segment 30 connected to a conductor 51; a number 3, of course, would be made with segments 40 being connected to conductors 41, 42, 44, 46, 48 and 49. A quite legible 0 would make use of segments 40 connected to conductors 41, 42, 48 and 49, and segments 30 connected to conductors 51, 56 and 58; and the number 7 would be made using segments 30 connected to conductors 52, 53 and 61; etc.

Figure 6:
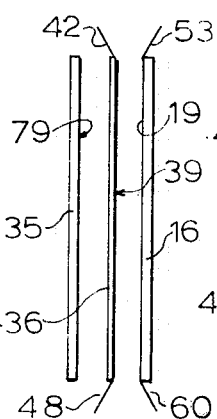
FIG. 6 represents a showing of an end view of three parts of the embodiment of FIG. 5, namely, the electrically conductive rear plate, the light transparent front plate and a cathode electrode support sheet.
Figure 7:
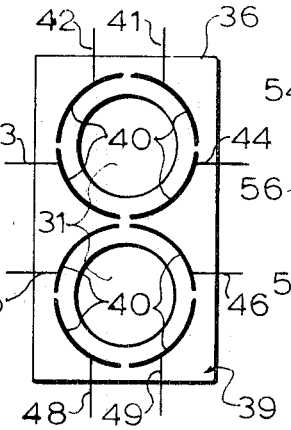
FIG. 7 is a plan view of the electrode support sheet showing an eight segment array of cathode electrodes supported thereon.
Figure 8:
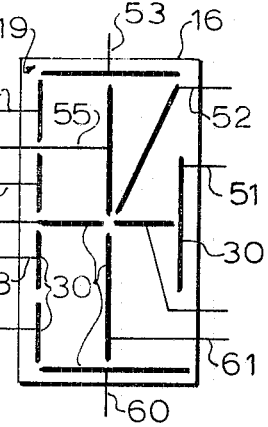
FIG. 8 is a plan view of the transparent plate showing a twelve segment array of cathode electrodes supported thereon and designed to be used in combination with the eight segment array of FIG. 7.
Figure 9:
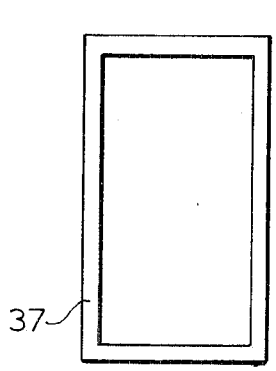
FIG. 9 represents an envelope vacuum sealing gasket that may be used in one or more of the embodiments.

The array of segments 30 in FIG. 8, when used in combination with the array of segments 40 in FIG. 7 are designed to display numerals 0 through 9 and several letters of the alphabet. But all of the letters of the alphabet, all numerals and many other symbols will be displayed with a high degree of legibility by replacing the array of FIG. 8 with that of FIG. 11, in the embodiment of FIGS. 5 and 6. It will be understood by those familiar with the present-day devices that an array of segments as shown in FIG. 11 is used to display a wide variety of characters, however, when utilized in the present invention with the array of FIG. 7 the improvement in much higher quality displays of such characters will be realized.

Figures 10, 11:
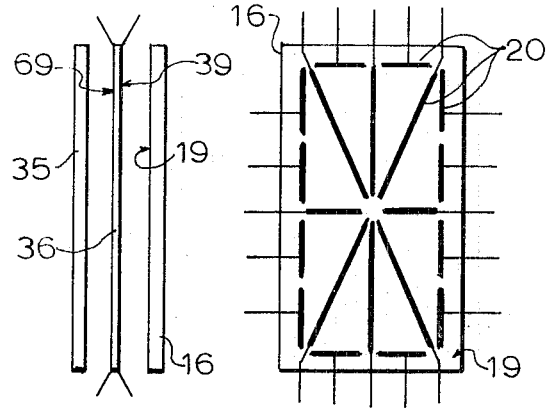
FIG. 10 represents a showing of an end view of three parts of still another embodiment of the invention, namely, a conductive rear plate, an electrode support sheet and a transparent front plate of an exploded view of a device.
FIG. 11 represents a plan view of the transparent plate showing a twenty segment array of cathode electrodes supported thereon.
Figure 12:
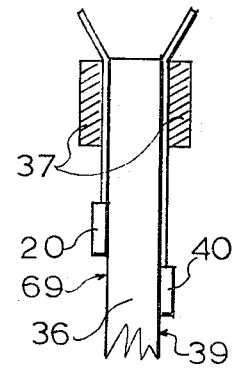
FIG. 12 represents a small portion of the electrode support sheet of the FIG. 10 embodiment to exemplify the showing of cathode electrodes and their respective conductor leads on opposing surfaces.

FIG. 10 shows still another embodiment, wherein an array of segments of FIG. 11 may be deposited on a surface 69 of the intermediate plate 36, and, in combination with having the array of segments of FIG. 7 deposited on the opposing surface 39 of the plate 36. This is an alternative to having the array of FIG. 11 on the front plate 16. Under such circumstances the intermediate plate 36 would be of light transparent material and, for example, not more than a few thousandths of an inch in thickness. This intermediate plate 36 of the FIGS. 10–12 embodiment will also be provided with one or more openings extending through its thickness dimension, such as in the case of the FIGS. 5–8 embodiment wherein the plate 36, on which the cathodes 40 are mounted, is shown in FIG. 7 as having openings 31 extending through its thickness dimension as a means of uniting the space 18 on opposite sides of the plate 36. Although not being shown in the FIG. 11 illustration, for example, there will be one or more such openings in the plate 36 of the FIGS. 10–12 embodiment as a means of uniting the space on opposite sides thereof. Such openings would be positioned therein intermediate the cathodes so as not to interfere with the support of the cathode electrodes 20 on the one surface 69 thereof, nor with the support of the cathode electrodes 40 on the opposing surface 39.

As I have stated in the summary of this invention, it lends itself extremely well to the manufacture of a very compact device. It will, therefore, be understood by those skilled in the art that there is growing demands for much smaller devices of the glow lamp type and that this invention includes structural features to satisfy such demands. For example, the embodiment of FIGS. 5 and 6 is designed to provide displays of a very large variety of message characters within a common display area measuring not more than ¼″ by ½″, while the overall size of the device is but ¼″ larger in each direction. The depth of such a unit need not be more than ¼″. If the intermediate plate of FIG. 7 is supported directly against the surface 79 of the rear plate 35, for example, this would represent a space saving in depth not illustrated in FIG. 5. However, the invention is not limited in this regard. The invention lends itself to the making of much smaller size devices than exemplified hereinbefore, and adapted for direct usage with printed circuit board support means. The particular embodiments of the invention illustrated and described herein, therefore, is illustrative only and the invention includes such other modifications and equivalents as may readily appear to those skilled in the arts, and within the scope of the appended claims.

I claim:
1. An indicating device of the gaseous glow type which utilizes an envelope containing an ionizable medium and a plurality of cathode electrodes, wherein the improvement comprises:
   (a) an envelope having an electrically conducting plate and a light transparent plate supported in a spaced-apart relationship with means for containing said ionizable medium in the space between said conducting plate and said transparent plate, said conducting plate and said transparent plate comprising, respectively, rear and front medium containing walls of said envelope;
   (b) a first plurality of cathode electrodes, each being an electrically isolated segment of one or more differently formed character shaped arrangements thereof wherein said segments are independently connected to individual conductor means extending to, and beyond, the outer limits of said envelope, said conductor means being adapted to have the influence of a first voltage polarity connected thereto;
   (c) a second plurality of cathode electrodes, each being an electrically isolated segment of one or more differently formed character shaped arrangements thereof wherein said segments are independently connected to individual conductor means extending to, and beyond, the outer limits of said envelope, said conductor means being adapted to have the influence of said first voltage polarity connected thereto;
   (d) said conducting plate being an anode of said plurality of cathode electrodes with means for having the influence of a second polarity voltage connected thereto;
   (e) said first and second cathode electrodes supported, respectively, in first and second planes in the space between said conducting plate and said transparent plate, and supported in relation to said transparent plate so as to provide, in combination, a plurality of predetermined character shaped arrangements of segments overlapping one another when viewed through and within a common light transparent area thereof.
2. The invention as set forth in claim 1 additionally including,
   (f) said transparent plate presenting an inner surface coincident with said first plane, said first cathode electrodes being supported on said inner surface, and means for supporting said second plurality of cathode electrodes closely adjacent said inner surface.

3. The invention as set forth in claim 1 additionally including,
   (f) a light transparent sheet of material intermediate said conducting plate and said transparent plate presenting first and second surfaces and means for supporting said first and second cathode electrodes, respectively, on said first and second surfaces.
4. An indicating device of the gaseous glow type which utilizes an envelope containing an ionizable medium, a plurality of cathode electrodes, an anode electrode and a light transparent wall through which said cathode electrodes can be viewed, wherein the improvement comprises:
   (a) a first plurality of cathode electrodes, each being an electrically isolated segment of one or more differently formed character shaped arrangements thereof wherein said segments are independently connected to individual conductor means extending to, and beyond, the outer limits of said envelope, said conductor means being adapted to have the influence of a first voltage polarity connected thereto;
   (b) a second plurality of cathode electrodes, each being an electrically isolated segment of one or more differently formed character shaped arrangements thereof wherein said segments are independently connected to individual conductor means extending to, and beyond, the outer limits of said envelope, said conductor means being adapted to have the influence of said first voltage polarity connected thereto;
   (c) said anode electrode being an anode of said first and second plurality of cathode electrodes with means for having the influence of a second polarity voltage connected thereto; and
   (d) said first and second cathode electrodes supported, respectively, in first and second planes and in relation to said light transparent wall so as to provide, in combination, a plurality of predetermined character shaped arrangements of segments overlapping one another when viewed through and within a common viewing area of said light transparent wall.
5. The invention as set forth in claim 4 additionally including,
   (e) said light transparent wall presenting an inner surface within said common viewing area for supporting said first cathode electrodes and means for supporting said second cathode electrodes closely adjacent said inner surface.
6. The invention as set forth in claim 4 additionally including,
   (e) a light transparent sheet of material presenting first and second surfaces, means for supporting said first and second plurality of cathode electrodes, respectively, on said first and second surfaces and means for supporting said sheet of material adjacent the common viewing area of said light transparent wall.

References Cited

UNITED STATES PATENTS 3,327,153   6/1967   Bickmire et al. _____ 313—109.5
3,327,154   6/1967   Bowerman _____ 313—109.5

RAYMOND F. HOSSFELD, Primary Examiner

U.S. Cl. X.R.
313—210